(12) United States Patent
Liu et al.

(10) Patent No.: US 7,445,380 B2
(45) Date of Patent: Nov. 4, 2008

(54) PERFORMANCE TESTING APPARATUS FOR HEAT PIPES

(75) Inventors: Tay-Jian Liu, Tu-Cheng (TW);
Chuen-Shu Hou, Tu-Cheng (TW);
Chao-Nien Tung, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 297 days.

(21) Appl. No.: 11/309,598

(22) Filed: Aug. 29, 2006

(65) Prior Publication Data
US 2007/0283771 A1 Dec. 13, 2007

(30) Foreign Application Priority Data
Jun. 9, 2006 (CN) .................. 2006 1 0061082

(51) Int. Cl.
*G01K 1/16* (2006.01)
*G01N 25/00* (2006.01)
(52) U.S. Cl. ............... 374/44; 374/29; 374/137; 374/208; 374/5; 374/57; 374/147
(58) Field of Classification Search .......... 374/4, 374/5, 29–32, 43–44, 57, 137, 147, 152, 374/153, 141, 145, 179, 208
See application file for complete search history.

(56) References Cited

U.S. PATENT DOCUMENTS

| 3,142,983 | A | * | 8/1964 | Dudley et al. ........... 374/29 |
| 4,826,327 | A | * | 5/1989 | Michell .................. 374/20 |
| 5,101,888 | A | * | 4/1992 | Sprouse et al. ........ 165/104.26 |
| 5,248,198 | A | * | 9/1993 | Droege ................... 374/7 |
| 5,355,683 | A | * | 10/1994 | Taylor ................... 62/51.1 |
| 5,409,055 | A | * | 4/1995 | Tanaka et al. ......... 165/104.33 |
| 6,883,594 | B2 | * | 4/2005 | Sarraf et al. .......... 165/104.33 |
| 7,147,368 | B2 | * | 12/2006 | Chien .................. 374/147 |
| 7,304,848 | B2 | * | 12/2007 | Chang .................. 361/701 |
| 2005/0274495 | A1 | * | 12/2005 | Wang et al. .......... 165/104.26 |
| 2006/0216561 | A1 | * | 9/2006 | Chien et al. ........... 429/26 |
| 2007/0006995 | A1 | * | 1/2007 | Lin ................... 165/104.26 |

\* cited by examiner

*Primary Examiner*—Gail Verbitsky (57) ABSTRACT

A performance testing apparatus for a heat pipe includes an immovable portion having a first heating member located therein for heating an evaporating section of the heat pipe. A movable portion is capable of moving relative to the immovable portion and has a second heating member located therein for heating the evaporating section. A receiving structure is defined between the immovable portion and the movable portion for receiving the evaporating section of the heat pipe therein. A concavo-convex cooperating structure is defined in the immovable portion and the movable portion to ensure the receiving structure being capable of receiving the heat pipe precisely. Temperature sensors are attached to the immovable portion and the movable portion for detecting temperature of the heat pipe. An enclosure encloses the immovable portion and the movable portions therein.

19 Claims, 6 Drawing Sheets

PERFORMANCE TESTING APPARATUS FOR HEAT PIPES

FIELD OF THE INVENTION

The present invention relates generally to testing apparatuses, and more particularly to a performance testing apparatus for heat pipes.

DESCRIPTION OF RELATED ART

It is well known that a heat pipe is generally a vacuum-sealed pipe. A porous wick structure is provided on an inner face of the pipe, and phase changeable working media employed to carry heat is included in the pipe. Generally, according to where the heat is input or output, a heat pipe has three sections, an evaporating section, a condensing section and an adiabatic section between the evaporating section and the condensing section.

In use, the heat pipe transfers heat from one place to another place mainly by exchanging heat through phase change of the working media. Generally, the working media is a liquid such as alcohol or water and so on. When the working media in the evaporating section of the heat pipe is heated up, it evaporates, and a pressure difference is thus produced between the evaporating section and the condensing section in the heat pipe. The resultant vapor with high enthalpy rushes to the condensing section and condenses there. Then the condensed liquid reflows to the evaporating section along the wick structure. This evaporating/condensing cycle continually transfers heat from the evaporating section to the condensing section. Due to the continual phase change of the working media, the evaporating section is kept at or near the same temperature as the condensing section of the heat pipe. Heat pipes are used widely owing to their great heat-transfer capability.

In order to ensure the effective working of the heat pipe, the heat pipe generally requires testing before being used. The maximum heat transfer capacity (Qmax) and the temperature difference ($\Delta T$) between the evaporating section and the condensing section are two important parameters in evaluating performance of the heat pipe. When a predetermined quantity of heat is input into the heat pipe through the evaporating section thereof, thermal resistance (Rth) of the heat pipe can be obtained from $\Delta T$, and the performance of the heat pipe can be evaluated. The relationship between these parameters Qmax, Rth and $\Delta T$ is Rth=$\Delta T$/Qmax. When the input quantity of heat exceeds the maximum heat transfer capacity (Qmax), the heat cannot be timely transferred from the evaporating section to the condensing section, and the temperature of the evaporating section increases rapidly.

A typical method for testing the performance of a heat pipe is to first insert the evaporating section of the heat pipe into a liquid at constant temperature; after a period of time the temperature of the heat pipe will become stable, then a temperature sensor such as a thermocouple, a resistance thermometer detector (RTD) or the like can be used to measure $\Delta T$ between the liquid and the condensing section of the heat pipe to evaluate the performance of the heat pipe. However, Rth and Qmax can not be obtained by this test, and the performance of the heat pipe can not be reflected exactly by this test.

Figure 5:
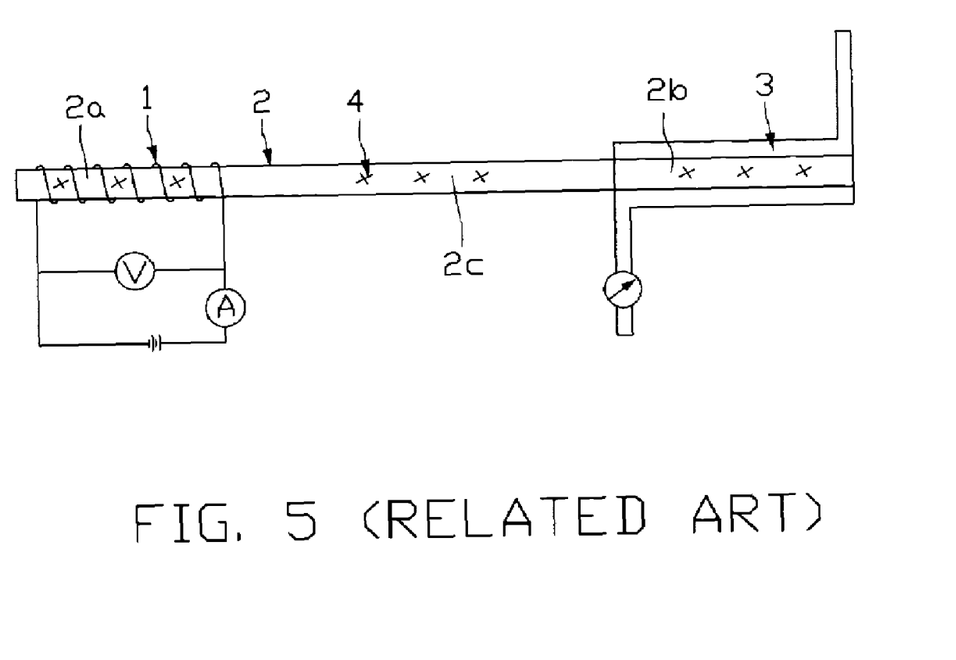
FIG. 5 is a performance testing apparatus for heat pipes in accordance with related art.

Referring to FIG. 5, a related performance testing apparatus for heat pipes is shown. The apparatus has a resistance wire 1 coiling round an evaporating section 2a of a heat pipe 2, and a water cooling sleeve 3 functioning as a heat sink and enclosing a condensing section 2b of the heat pipe 2. In use, electrical power controlled by a voltmeter and an ammeter flows through the resistance wire 1, whereby the resistance wire 1 heats the evaporating section 2a of the heat pipe 2. At the same time, by controlling flow rate and temperature of cooling liquid entering the cooling sleeve 3, the heat input at the evaporating section 2a can be removed from the heat pipe 2 by the cooling liquid at the condensing section 2b, whereby a stable operating temperature of adiabatic section 2c of the heat pipe 2 is obtained. Therefore, Qmax of the heat pipe 2 and $\Delta T$ between the evaporating section 2a and the condensing section 2b can be obtained by temperature sensors 4 at different positions on the heat pipe 2.

However, in the test, the related testing apparatus has the following drawbacks: a) it is difficult to accurately determine lengths of the evaporating section 2a and the condensing section 2b which are important factors in determining the performance of the heat pipe 2; b) heat transference and temperature measurement may easily be affected by environmental conditions; and, c) it is difficult to achieve sufficiently intimate contact between the heat pipe and the heat source and between the heat pipe and the heat sink, which results in uneven performance test results of the heat pipe. Furthermore, due to awkward and laborious assembly and disassembly in the test, the testing apparatus can be only used in the laboratory, and can not be used in the mass production of heat pipes.

In mass production of heat pipes, a large number of performance tests are needed, and the apparatus is used frequently over a long period of time; therefore, the apparatus not only requires good testing accuracy, but also requires easy and accurate assembly to the heat pipes to be tested. The testing apparatus affects the yield and cost of the heat pipes directly; therefore, testing accuracy, facility, speed, consistency, reproducibility and reliability need to be considered when choosing the testing apparatus. Therefore, the testing apparatus needs to be improved in order to meet the demand for mass production of heat pipes.

What is needed, therefore, is a high performance testing apparatus for heat pipes suitable for use in mass production of heat pipes.

SUMMARY OF THE INVENTION

A performance testing apparatus for a heat pipe in accordance with a preferred embodiment of the present invention comprises an immovable portion having a heating member located therein for heating an evaporating section of the heat pipe. A movable portion is capable of moving relative to the immovable portion and has a second heating member located therein for heating the evaporating section of the heat pipe. A receiving structure is defined between the immovable portion and the movable portion for receiving the evaporating section of the heat pipe therein. A concavo-convex cooperating structure is defined in the immovable portion and the movable portion for avoiding the movable portion from deviating from the immovable portion to ensure the receiving structure being capable of receiving the heat pipe precisely. At least one temperature sensor is attached to at least one of the immovable portion and the movable portion for thermally contacting the heat pipe in the receiving structure for detecting temperature of the heat pipe. An enclosure encloses the immovable portion and the movable portions therein, and defines a space therein for movement of the movable portion relative to the immovable portion.

Other advantages and novel features will become more apparent from the following detailed description of preferred embodiments when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
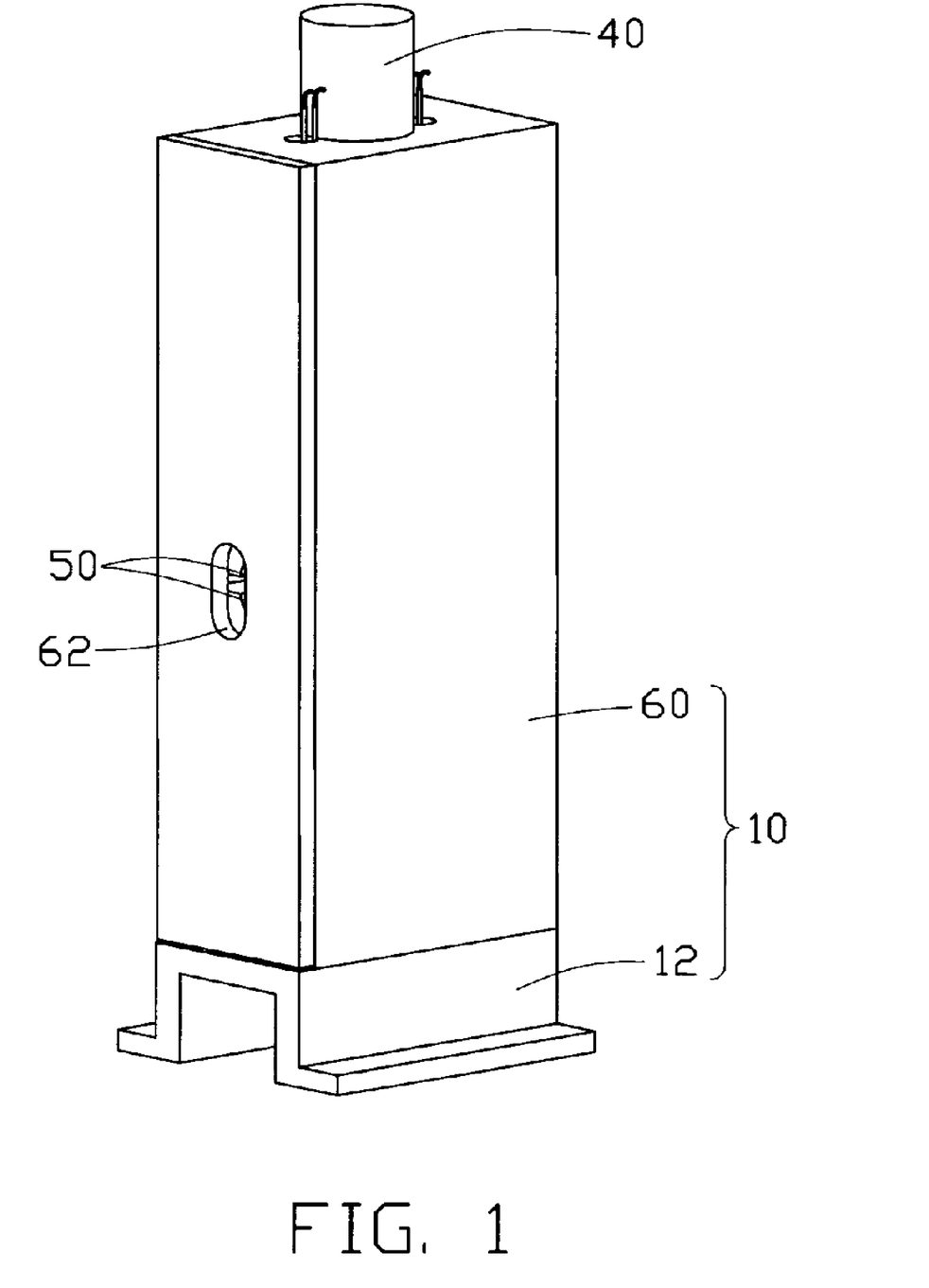
FIG. 1 is an assembled view of a performance testing apparatus for heat pipes in accordance with a preferred embodiment of the present invention.
Figure 2:
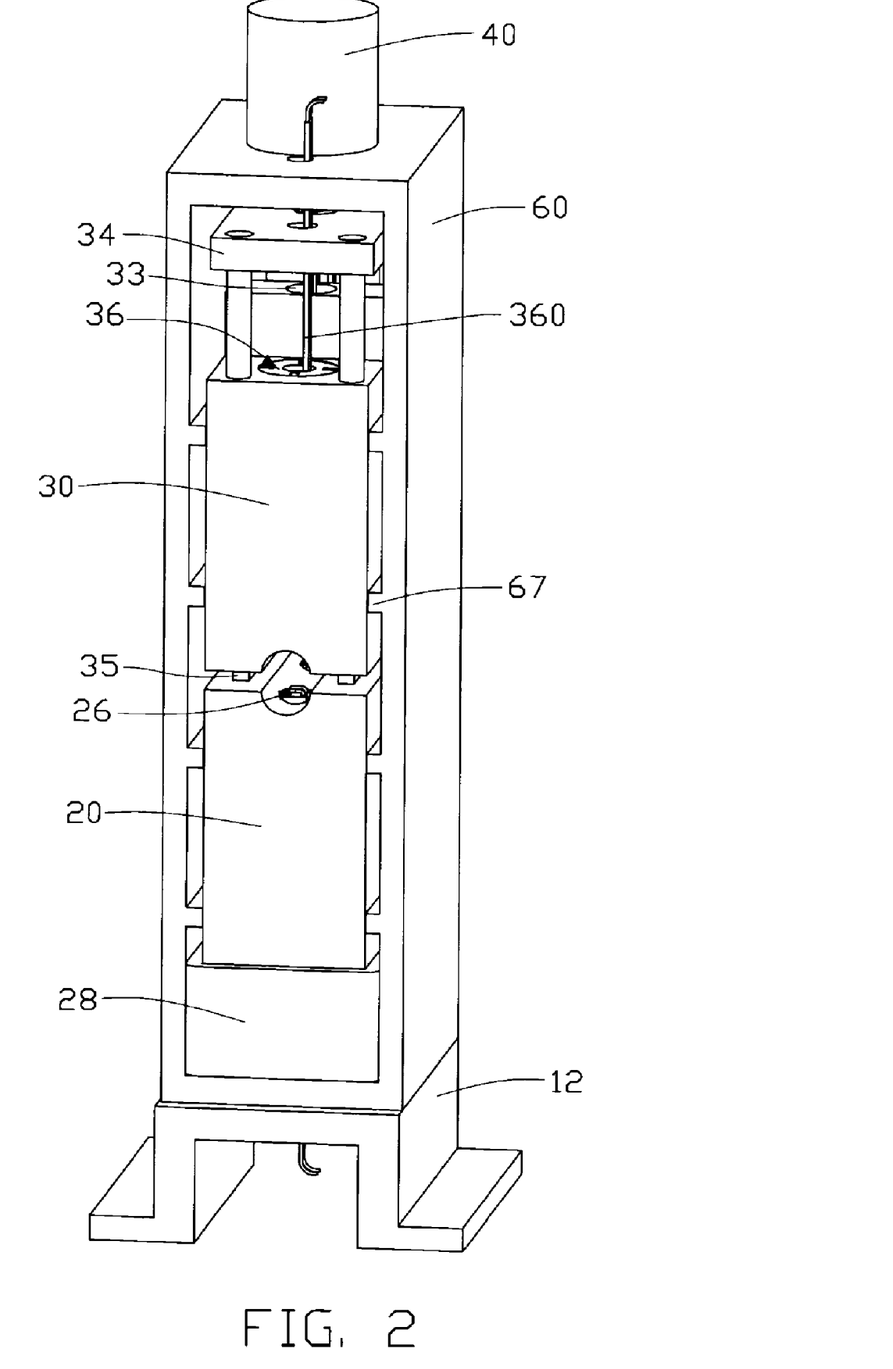
FIG. 2 shows the testing apparatus of FIG. 1 from a different aspect, wherein a door board of the apparatus is removed.
Figure 3:
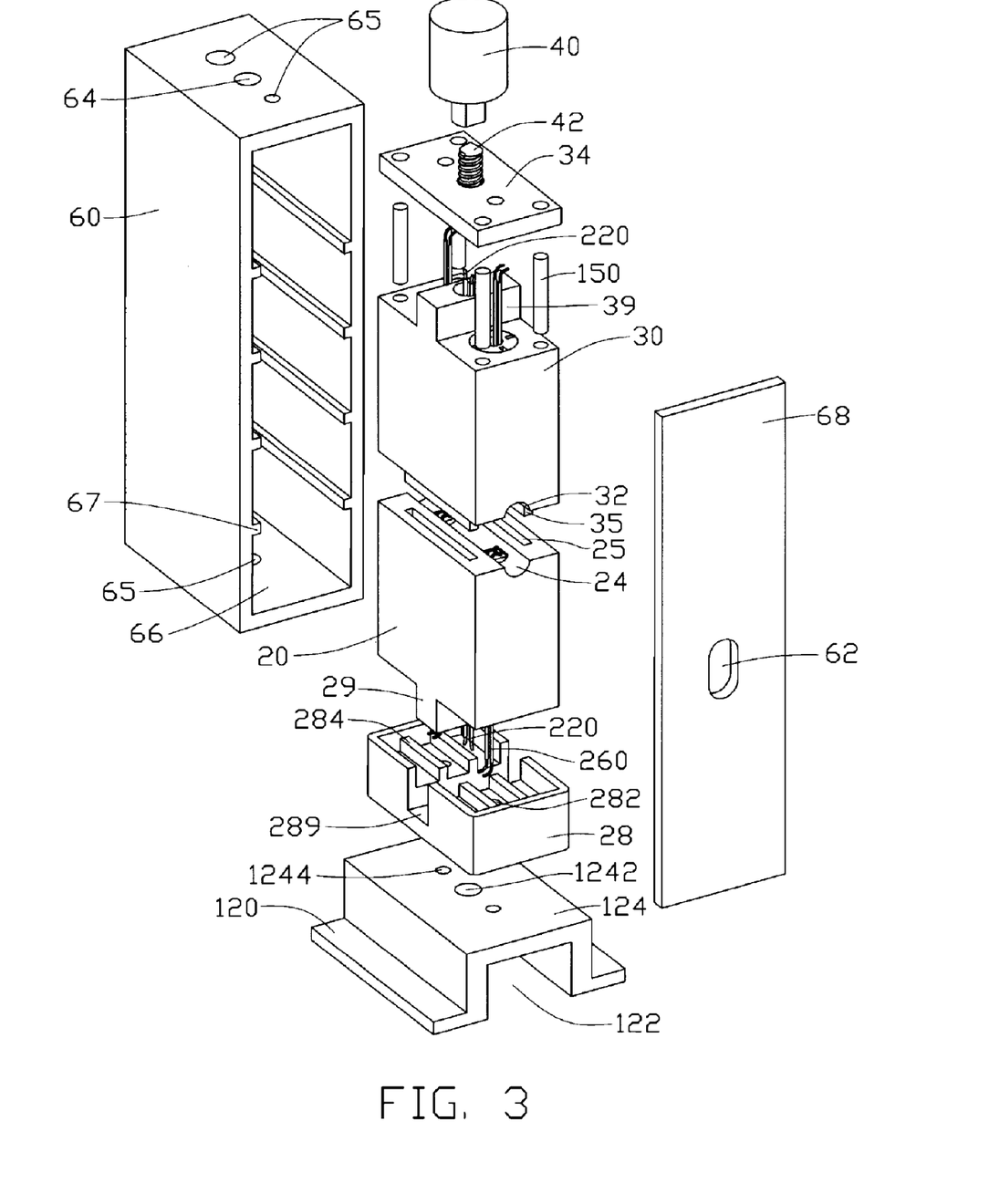
FIG. 3 is an exploded, isometric view of the testing apparatus of FIG. 1 viewed from another aspect.

Referring to FIGS. 1-3, a performance testing apparatus for heat pipes comprises an immovable portion 20 and a movable portion 30 movably mounted on the immovable portion 20. The performance testing apparatus is to be held on a platform of a supporting member such as a testing table or so on.

The immovable portion 20 is made of metal having good heat conductivity. The immovable portion 20 has an extension 29 extending downwardly from a center of a bottom thereof. A first heating member (not labeled) such as an immersion heater, resistance coil, quartz tube and Positive temperature coefficient (PTC) material or the like is embedded in the immovable portion 20. The immovable portion 20 defines a hole (not shown) vertically through the extension 29. In the case, the first heating member is an elongated cylinder and is accommodated in the hole of the immovable portion 20 from the bottom of the immovable portion 20. Two spaced wires 220 extend from a bottom end of the first heating member beyond the extension 29 to connect with a power supply (not shown). The immovable portion 20 has a heating groove 24 defined in a top face thereof, for receiving an evaporating section of the heat pipe to be tested therein. Two temperature sensors 26 are inserted into the immovable portion 20 at two opposite sides of the first heating member from the bottom of the immovable portion 20 so as to position detecting portions (not labeled) of the sensors 26 in the heating groove 24. The detecting portions are capable of automatically contacting the heat pipe in order to detect a temperature of the evaporating section of the heat pipe.

The movable portion 30 is also made of material having good heat conductivity. The movable portion 30 has an extension 39 extending upwardly from a middle of a top surface thereof. The movable portion 30 defines a hole 33 in the extension 39. A second heating member (not labeled) is accommodated in the hole 33 of the extension 39 of the movable portion 30. Two spaced wires 220 extend upwardly from a top end of the second heating member beyond the extension 39 for connecting with the power supply (not shown). The movable portion 30, corresponding to the heating groove 24 of the immovable portion 20, has a heating groove 32 defined in a bottom face thereof, whereby a testing channel 50 is cooperatively defined by the heating grooves 24, 32 when the movable portion 30 moves to reach the immovable portion 20. Thus, an intimate contact between the heat pipe and the movable and immovable portions 30, 20 defining the channel 50 can be realized, thereby reducing heat resistance between the heat pipe and the movable and immovable portions 30, 20. Two temperature sensors 36 are inserted into the movable portion 30 from a top thereof to reach a position wherein detecting portions (not shown) of the sensors 36 are located in the heating groove 32. The detecting portions are capable of automatically contacting the heat pipe to detect the temperature of the evaporating section of the heat pipe. A board 34 is positioned over the movable portion 30. Four columns 150 are secured at corresponding four corners of the movable portion 30 and extend upwardly to engage in corresponding four through holes (not labeled) defined in four corners of the board 34. The board 34 defines two through apertures (not labeled) therein to allow wires 360 of the temperature sensors 36 to extend therethrough to connect with a monitoring computer (not shown).

The movable portion 30 extends two elongated bars 35 downwardly and integrally from a bottom face thereof towards the immovable portion 20. The elongated bars 35 are located at two sides of the heating groove 32 of the movable portion 30. Corresponding to the bars 35 of the movable portion 30, the immovable portion 20 defines two slots 25 in a top face thereof. The bars 35 are slidably received in the corresponding slots 25. The bars 35 are always received in the slots 25 when the movable portion 30 moves toward the immovable portion 20 to reach a position wherein the bottom face of the movable portion 30 contacts the top face of the immovable portion 20. The bars 35 and the slots 25 concavoconvexly cooperate to avoid the movable portion 30 from deviating from the immovable portion 20 during test of the heat pipes, thereby ensuring the grooves 24, 32 of the immovable, movable portions 20, 30 to precisely align with each other. Accordingly, the channel 50 can be accurately formed for precisely receiving the heat pipe therein for test. Alternatively, the movable portion 30 can have two bars slidably engaging in two slots defined in the immovable portion 20 to keep the immovable portion 20 aligned with the movable portion 30.

The channel 50 as shown in the preferred embodiment has a circular cross section enabling it to receive the evaporating section of the heat pipe having a correspondingly circular cross section. Alternatively, the channel 50 can have a rectangular cross section when the evaporating section of the heat pipe also has a flat rectangular configuration.

In order to ensure that the heat pipe is in close contact with the movable and immovable portions 30, 20, a supporting frame 10 is used to support and assemble the immovable and movable portions 20, 30. The immovable portion 20 is fixed on the supporting frame 10. A driving device 40 is installed on the supporting frame 10 to drive the movable portion 30 to make accurate linear movement relative to the immovable portion 20 along a vertical direction, thereby realizing the intimate contact between the heat pipe and the movable and immovable portions 30, 20. In this manner, heat resistance between the evaporating section of the heat pipe and the movable and immovable portions 30, 20 can be minimized.

The supporting frame 10 comprises a seat 12. The seat 12 comprises a supporting plate 124 at a top thereof and two feet 120 depending from the supporting plate 124. A space 122 is defined between the two feet 120 of the seat 12 for extension of wires 260 of the temperature sensors 26 and the wires 220 of the first heating member. The supporting plate 124 defines a central through hole 1242 to allow the wires 220 of the first heating member to extend therethrough to connect with the power supply (not shown), and two through apertures 1244 to allow the wires 260 of the temperature sensors 26 to extend therethrough to connect with the monitoring computer (not shown).

In order to construct a thermally steady environment for testing the heat pipes, the supporting frame 10 further comprises a cuboidal enclosure 60 enclosing the immovable and movable portions 20, 30 therein. The enclosure 60 has a bottom 66 positioned on the supporting plate 124 of the supporting frame 10 and three interconnecting sidewalls (not labeled) extending upwardly from the bottom 66. An entrance (not labeled) is defined in an opened side of the enclosure 60 for disposing the movable portion 30 and the immovable portion 20 into the enclosure 60. A door board 68 is removably attached to the entrance for facilitating the immovable portion 20 and the movable portion 30 entering into/exiting out of the enclosure 60. Corresponding to the channel 50 between the immovable portion 20 and the movable portion 30, openings 62 are defined in one of the sidewalls opposite the door board 68 and the door board 68 of the enclosure 60, wherein the opening of the sidewall is not shown. A top wall (not labeled) of the enclosure 60 defines a through hole 64 for a shaft of the driving device 40 to extend therethrough. Two apertures 65 are defined at two sides of the through hole 64 in the top wall to allow wires (not labeled) of the temperature sensors 36 and the wires 220 of the second heating member to extend therethrough to connect with the monitoring computer and the power supply. In order to prevent heat in the immovable portion 20 from spreading to the enclosure 60, a thermally insulating member 28 is located at the bottom of the immovable portion 20. The insulating member 28 receives the bottom of the immovable portion 20 therein. The insulating member 28, corresponding to the extension 29 of the immovable portion 20, defines a concave 289 receiving the extension 29 therein. At two sides of the concave 289, a plurality of ribs 284 extends from a bottom of the insulating member 28 to support the bottom of the immovable portion 20 thereon. The insulating member 28, the bottom 66 of the enclosure 60 and the supporting plate 124 define corresponding through holes 1242, and through apertures 65, 282, 1244, wherein the through holes defined in the bottom 66 and the insulating member 28 are not shown, for the wires 220 of the first heating member and the wires 260 of the temperature sensors 26 of the immovable portion 20 to extend therethrough to connect with the power supply and the monitoring computer. The driving device 40 is fixed to the top wall of the enclosure 60. The shaft of the driving device 40 extends through the hole 64 and threadedly engages with a bolt 42 secured to the board 34 of the movable portion 30. A space (not labeled) is defined between the board 34 and the top wall of the enclosure 60 for movement of the movable portion 30. When the driving device 40 operates, the shaft rotates, the bolt 42 with the board 34, and the movable portion 30 move upwardly or downwardly relative to the immovable portion 20 in the enclosure 60. Two opposite ones of the sidewalls of the enclosure 60 each form a plurality of ribs 67 thereon. The ribs 67 abut opposites sides of the immovable and movable portions 20, 30, whereby heat of the immovable and movable portions 20, 30 can be prevented from spreading to the enclosure 60.

The driving device 40 in this preferred embodiment is a step motor, although it can be easily apprehended by those skilled in the art that the driving device 40 can also be a pneumatic cylinder or a hydraulic cylinder. In use, the driving device 40 accurately drives the movable portion 30 to move linearly relative to the immovable portion 20. For example, the movable portion 30 can be driven to depart a certain distance such as 5 millimeters from the immovable portion 20 to facilitate the insertion of the evaporating section of the heat pipe being tested into the channel 50 or withdrawn from the channel 50 after the heat pipe has been tested. On the other hand, the movable portion 30 can be driven to move toward the immovable portion 20 to thereby realize an intimate contact between the evaporating section of the heat pipe and the immovable and movable portions 20, 30 during the test. Accordingly, the requirements for testing, i.e. accuracy, ease of use and speed, can be realized by the testing apparatus in accordance with the present invention.

It can be understood that positions of the immovable portion 20 and the movable portion 30 can be exchanged, i.e., the movable portion 30 being positioned on the bottom wall 66 of the enclosure 60, and the immovable portion 20 being located on the movable portion 30. The driving device 40 is positioned to be adjacent to the immovable portion 20 and drives the immovable portion 20 move relative to the movable portion 30 in the enclosure 60. Alternatively, each of the immovable and movable portions 20, 30 has one driving device 40 installed thereon to move them toward/away from each other.

In use, the evaporating section of the heat pipe is received in the heating groove 24 of the immovable portion 20 from the opening 62 of the enclosure 60 when the movable portion 30 moves away from the top face of the immovable portion 20 with the bars 35 sliding in the slots 25. Then the movable portion 30 moves to reach the top face of the immovable portion 20 so that the evaporating section of the heat pipe is tightly fitted into the channel 50. The sensors 26, 36 are in thermal contact with the evaporating section of the heat pipe; therefore, the sensors 26, 36 work to accurately send detected temperatures from the evaporating section of the heat pipe to the monitoring computer. Based on the temperatures obtained by the plurality of sensors 26, 36, an average temperature can be obtained by the monitoring computer very quickly; therefore, performance of the heat pipe can be quickly decided.

Figure 4A:
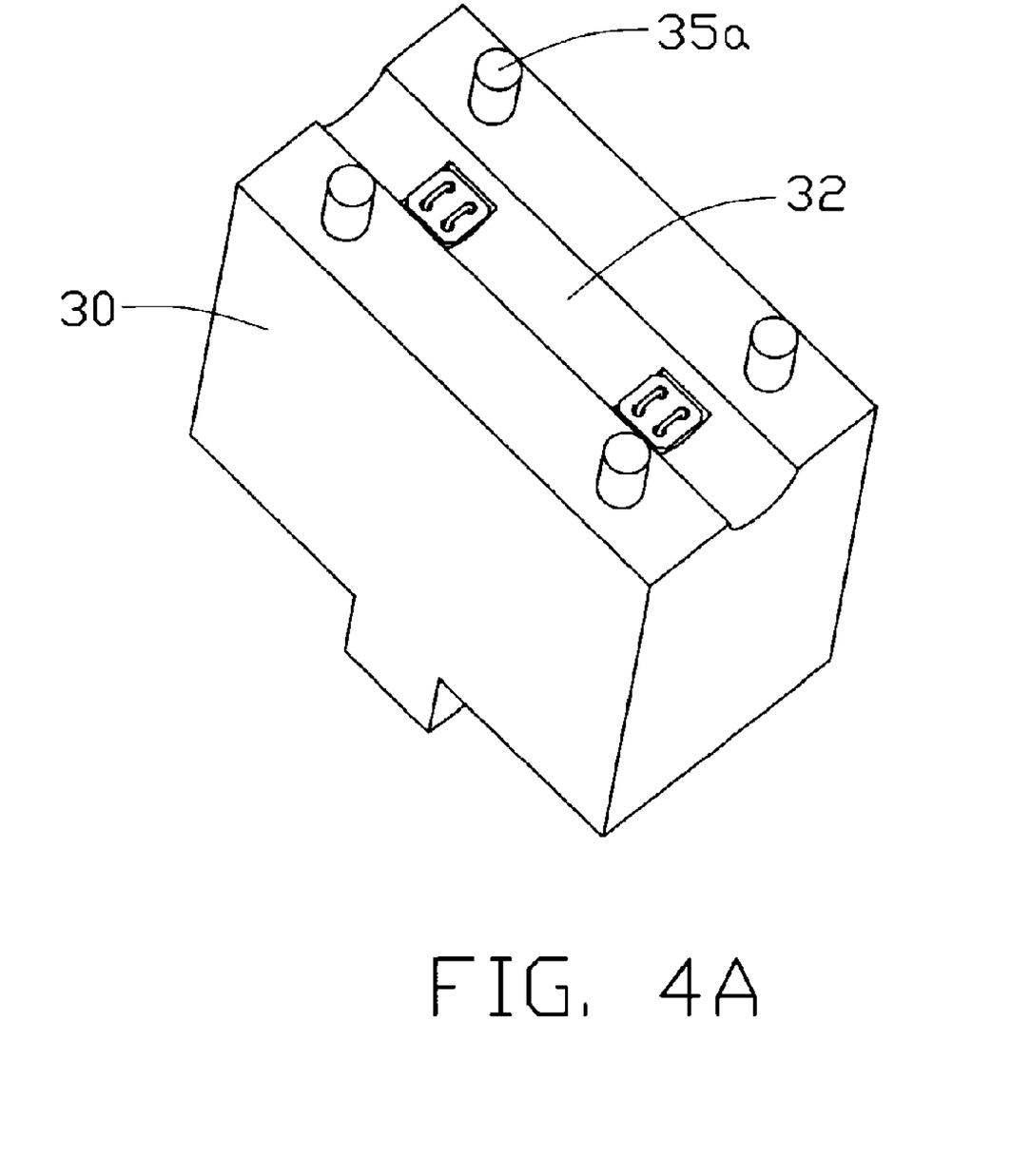
FIG. 4A shows a movable portion of a performance testing apparatus for heat pipes in accordance with an alternative embodiment of the present invention.
Figure 4B:
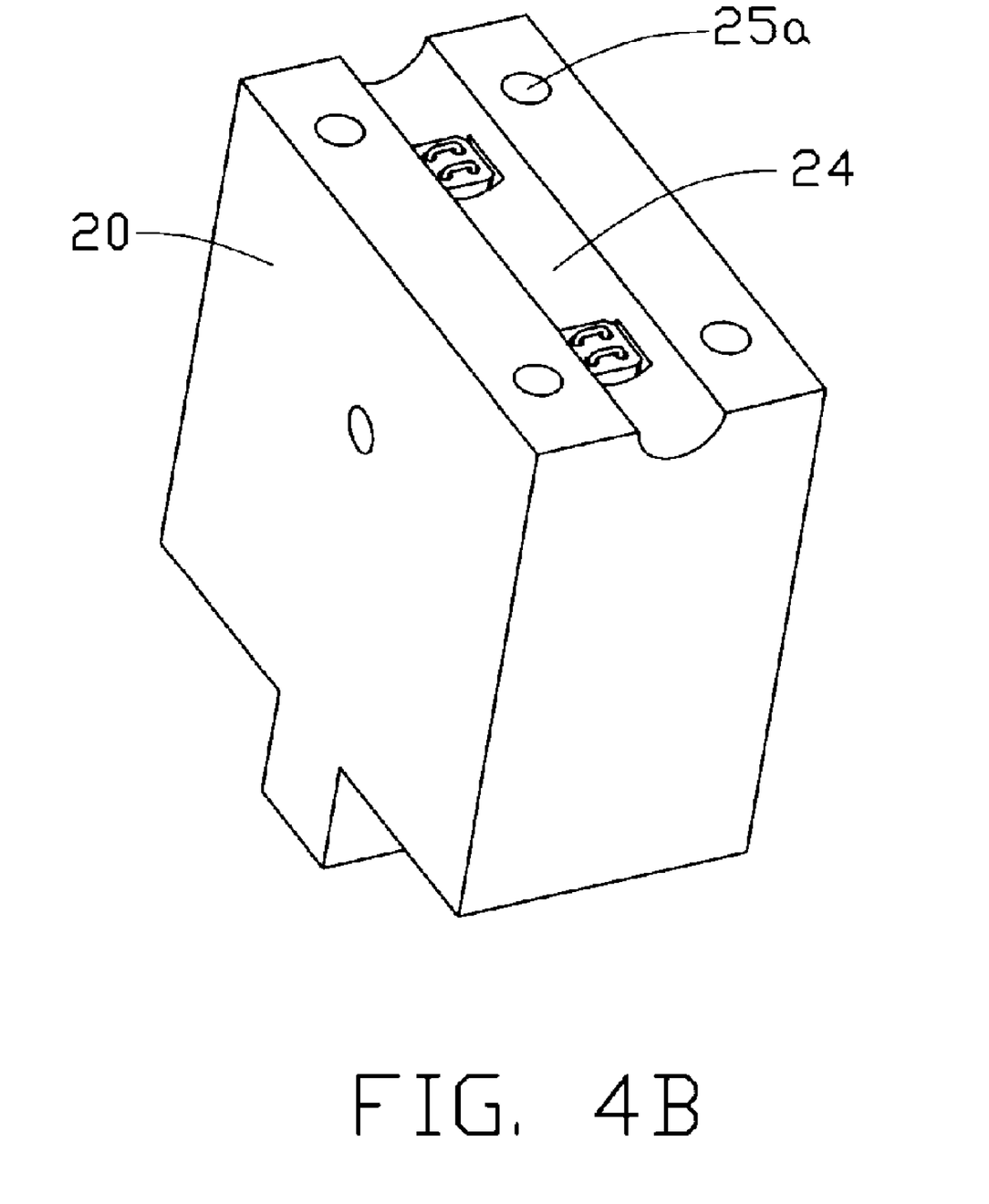
FIG. 4B shows an immovable portion of the testing apparatus in accordance with the alternative embodiment of the present invention.

Referring to FIGS. 4A and 4B, an immovable portion 20 and a movable portion 30 of a performance testing apparatus for heat pipes in accordance with an alternative embodiment of the present invention are shown. Different from the previous preferred embodiment, the movable portion 30 in accordance with the alternative embodiment has a plurality of cylindrical posts 35a extending downwardly and integrally from a bottom face thereof towards the immovable portion 20. The cylindrical posts 35a are evenly located at two sides of the heating groove 32 of the movable portion 30. Corresponding to the posts 35a of the movable portion 30, the immovable portion 20 in accordance with the alternative embodiment has a plurality of positioning holes 25a defined in a top face thereof. The posts 35a are slidably inserted into the corresponding holes 25a. The posts 35a are always received in the holes 25a when the movable portion 30 moves relative to the immovable portion 20.

Additionally, in the present invention, in order to lower cost of the testing apparatus, the insulating member 28, the board 34 and the enclosure 60 can be made from low-cost material such as PE (Polyethylene), ABS (Acrylonitrile Butadiene Styrene), PF (Phenol-Formaldehyde), PTFE (Polytetrafluoroethylene) and so on. The immovable portion 20 and movable portion 30 can be made from copper (Cu) or aluminum (Al). The immovable portion 20 and movable portion 30 can have silver (Ag) or nickel (Ni) plated on faces thereof defining the heating grooves 24, 32 to prevent oxidization of the faces.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A performance testing apparatus for a heat pipe comprising:
    an immovable portion having a first heating member located therein for heating an evaporating section of the heat pipe;
    a movable portion capable of moving relative to the immovable portion and having a second heating member located therein for heating the evaporating section of the heat pipe;
    a receiving structure being defined between the immovable portion and the movable portion for receiving the evaporating section of the heat pipe therein;
    a concavo-convex cooperating structure defined in the immovable portion and the movable portion for avoiding the movable portion from deviating from the immovable portion to ensure the receiving structure being capable of receiving the heat pipe precisely;
    at least one temperature sensor being attached to at least one of the immovable portion and the movable portion for thermally contacting the heat pipe in the receiving structure for detecting temperature of the heat pipe; and
    an enclosure enclosing the immovable portion and the movable portions therein, and defining a space therein for movement of the movable portion relative to the immovable portion.

2. The testing apparatus of claim 1, wherein the receiving structure is a channel defined between the immovable portion and the movable portion.

3. The testing apparatus of claim 2, wherein the channel is cooperatively defined by a heating groove defined in a face of the immovable portion and a heating groove defined in a face of the movable portion, and wherein the at least one temperature sensor has a portion thereof exposed to the channel to detect the temperature of the heat pipe.

4. The testing apparatus of claim 2, wherein the concavo-convex cooperating structure is two slots defined in one of the immovable portion and the movable portion, and two bars extending from the other of the immovable portion and the movable portion, the bars being slidably received in corresponding slots.

5. The testing apparatus of claim 4, wherein the bars are located at two opposite sides of the channel.

6. The testing apparatus of claim 2, wherein the concavo-convex cooperating structure is a plurality of holes defined in one of the immovable portion and the movable portion, and a plurality of posts extending from the other of the immovable portion and movable portion, the posts being slidably received in corresponding holes.

7. The testing apparatus of claim 6, wherein the posts are evenly located at two opposite sides of the channel.

8. The testing apparatus of claim 2 further comprising a seat for positioning the testing apparatus at a required position, wherein the enclosure sits on a supporting plate of the seat.

9. The testing apparatus of claim 8, wherein the seat comprises two spaced supporting feet depending from the supporting plate, a space being defined between the two feet.

10. The testing apparatus of claim 8, wherein the enclosure comprises a bottom sitting on the supporting plate of the seat, a plurality of sidewalls extending from the bottom, the immovable portion being positioned between a pair of the sidewalls.

11. The testing apparatus of claim 10, wherein the enclosure has a door board removably attached to an opened side thereof, the door board and the sidewalls cooperatively define a room accommodating the immovable portion and the movable portion therein.

12. The testing apparatus of claim 11, wherein the door board of the enclosure defines an opening through which the evaporating section of the heat pipe can be inserted into the channel.

13. The testing apparatus of claim 10, wherein the pair of the sidewalls of the enclosure each extends a plurality of ribs abutting against the immovable portion.

14. The testing apparatus of claim 10 further comprising an insulating member located between the immovable portion and the bottom of the enclosure.

15. The testing apparatus of claim 14, wherein the insulating member receives a bottom of the immovable portion therein.

16. The testing apparatus of claim 15, wherein the insulating member extends a plurality of ribs from a bottom thereof to support the immovable portion thereon.

17. The testing apparatus of claim 10 further comprising a driving device mounted on a top wall of the enclosure, wherein the driving device connects with the movable portion and capable of driving the movable portion to move away and towards the immovable portion in the enclosure.

18. The testing apparatus of claim 1, wherein the first heating member of the immovable portion is accommodated in a hole defined in the immovable portion, and extends two wires to connect with a power supply.

19. The testing apparatus of claim 1, wherein the second heating member of the movable portion is accommodated in a hole defined in the movable portion, and extends two wires to connect with a power supply.

* * * * *